United States Patent [19]
Crayne et al.

[11] Patent Number: 5,416,249
[45] Date of Patent: May 16, 1995

[54] APPARATUS AND METHOD FOR ENCAPSULING DRUMS CONTAINING HAZARDOUS WASTES

[75] Inventors: Lynn M. Crayne, Jefferson; Gary J. Zawada, Bethel Park, both of Pa.

[73] Assignee: Nicholson Construction Company, Bridgeville, Pa.

[21] Appl. No.: 105,718

[22] Filed: Aug. 12, 1993

[51] Int. Cl.⁶ .................................................. B09B 3/00
[52] U.S. Cl. ........................... 588/252; 220/466; 588/249; 588/259
[58] Field of Search ............... 588/249, 252, 259, 255, 588/256, 257; 405/128, 129; 220/411, 415, 466, 469

[56] References Cited

U.S. PATENT DOCUMENTS

| | | | |
|---|---|---|---|
| 4,453,857 | 6/1984 | Serra et al. | 588/259 |
| 4,708,258 | 11/1987 | Shaw et al. | 220/288 |
| 4,877,353 | 10/1989 | Wisotsky | 405/128 |
| 5,254,798 | 10/1993 | Zoback | 588/259 |

OTHER PUBLICATIONS

Pp. 70, 71 and 72 of the Jan., 1993 PIGALOG catalog.
Single-page brochure for POLY-OVERPAK.
Two-page brochure of ENVIROPACK CO.
Two-page brochure of General Container Corp.

*Primary Examiner*—David H. Corbin
*Attorney, Agent, or Firm*—Buchanan Ingersoll; George Raynovich, Jr.

[57] ABSTRACT

Apparatus and method are provided for encapsuling hazardous wastes materials stored in drums. The drum is enclosed in an overcapsule that is grouted to the drum and the contents of the drum are stabilized if necessary with a solidification grout. Once the grouts have set, the overcapsule is positioned onto an undercapsule and grouted to the undercapsule so that the entire capsule with the drum containing hazardous waste inside may safely be transported and stored. The capsule is shaped so that the individual capsules may be stacked one on the other.

6 Claims, 5 Drawing Sheets

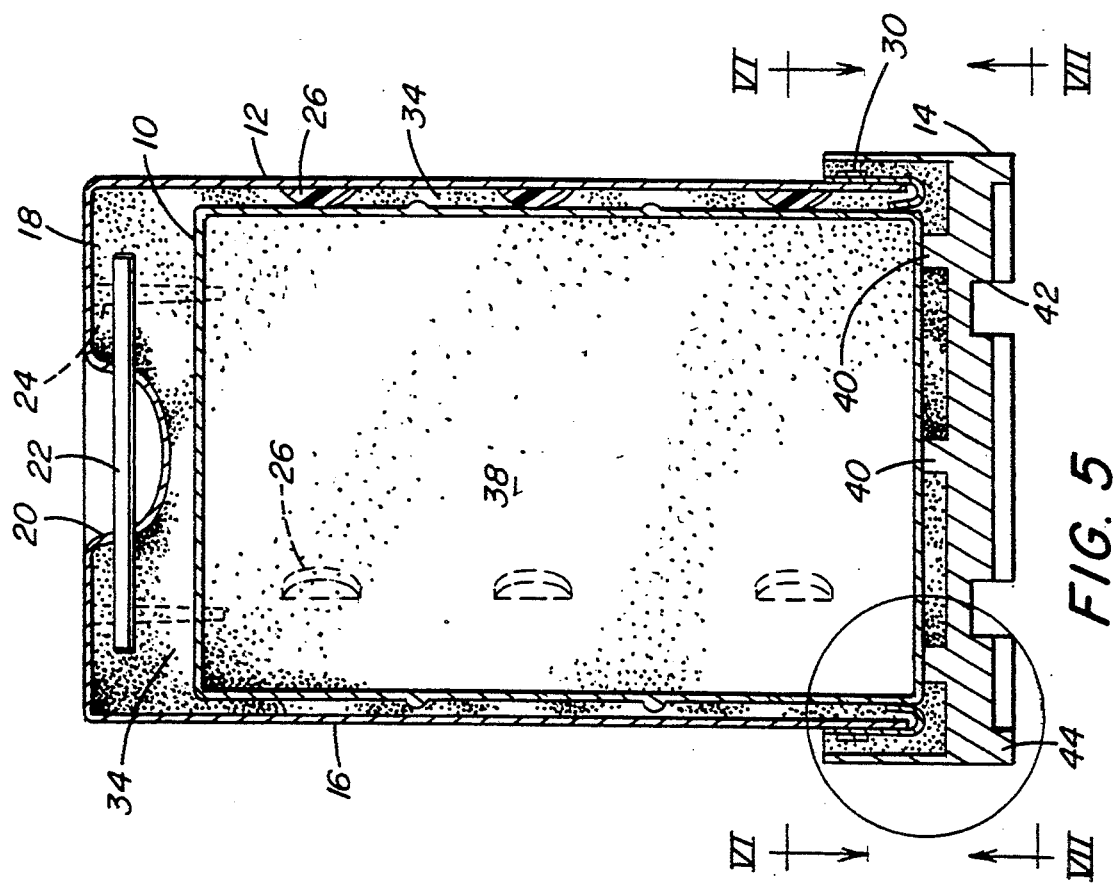
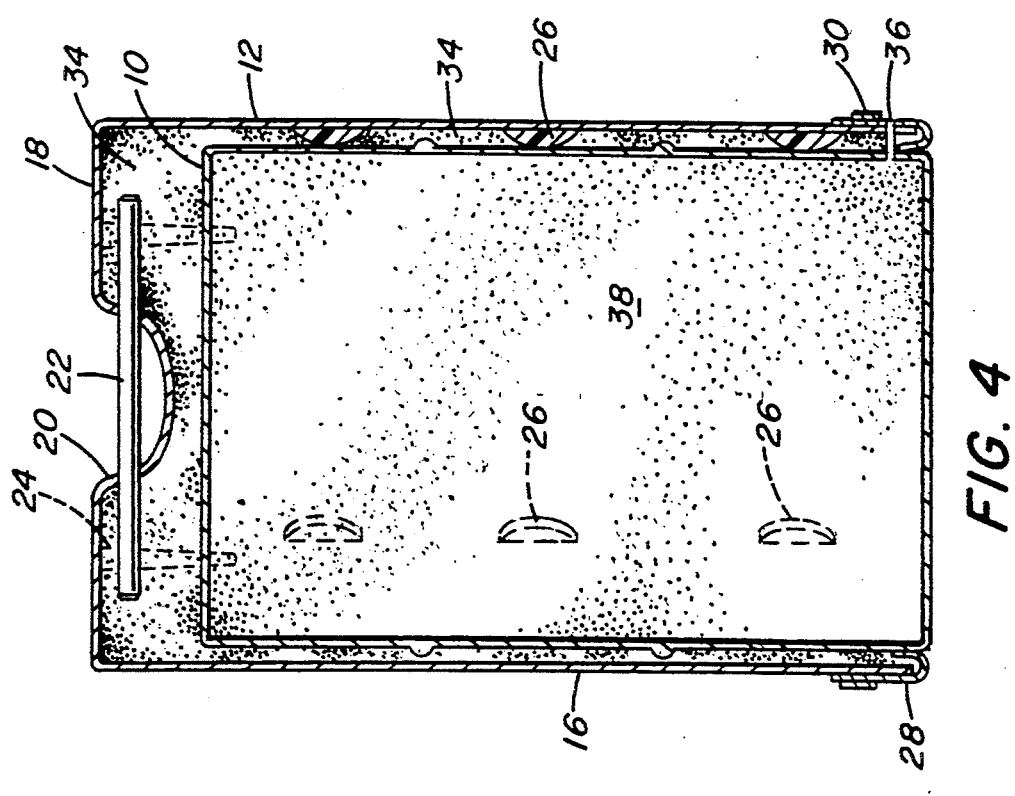
FIG. 5
FIG. 4

APPARATUS AND METHOD FOR ENCAPSULING DRUMS CONTAINING HAZARDOUS WASTES

BACKGROUND OF THE INVENTION

1. Field of the Invention

This invention relates to apparatus and a method for encapsuling drums containing hazardous waste so that the drums may be stored and transported without danger to those in the vicinity of the drums. The hazardous waste may be radioactive.

2. Description of the Prior Art

With the advent of modern environmental laws and the realization that hazardous wastes can cause severe damage to the environment and those exposed to the hazardous waste, many methods have been proposed to treat, transport and store hazardous wastes to render them safe. Hazardous waste containers have been developed to store smaller quantities of hazardous waste. An example of such a container is disclosed in U.S. Pat. No. 4,708,258.

Until now, no apparatus and no method have been proposed for safely transporting and storing hazardous waste material that is already stored in metal drums which may be deteriorating as a result of age or the corrosive action of the hazardous material itself.

SUMMARY OF THE INVENTION

In accordance with the present invention, there is provided apparatus for encapsuling a cylindrical drum containing hazardous waste material for subsequent transportation and storage of the drum. An overcapsule having a cylindrical wall longer than the overall length of the drum and having an inside diameter greater than the outside diameter of the drum with a closed end wall is provided. The overcapsule has spacers abutting the drum outer surface when the overcapsule is positioned over the drum to maintain a uniform annular space between the cylindrical drum and the inner cylindrical surface of the overcapsule. A seal formed on the open end of the overcapsule cooperates with the cylindrical drum to form a sealed annular space around the drum and a sealed cylindrical space above the drum. Encapsulation grout fills the sealed annular space around the drum and the sealed cylindrical space above the drum. An undercapsule is formed to receive the end of the overcapsule with the cylindrical drum grouted within the overcapsule to enclose the bottom the drum and the end of the overcapsule. Encapsulation grout is provided to fill all the spaces between the bottom of the drum and the undercapsule and between the overcapsule and the undercapsule.

Further in accordance with the present invention, there is provided a method of encapsuling a cylindrical drum containing hazardous waste material for subsequent transportation and storage of the drum. The method includes placing an inverted overcapsule over the drum to enclose the top and the entire cylindrical wall of the drum with the walls of the overcapsule being spaced apart from the top and the cylindrical wall of the drum. The space between the bottom of the drum cylindrical wall and the bottom of the overcapsule cylindrical wall is sealed. An encapsulation grout is injected into the space between the cylindrical drum and the overcapsule and the encapsulation grout hardens to form a dense shell around the cylindrical drum. An injection port is formed through the lower portion of the overcapsule, through the hardened encapsulation grout and through the drum and thereafter a solidification grout is injected through the port to solidify and stabilize the hazardous waste material within the drum. The overcapsule and the drum are then placed onto an undercapsule and encapsulation grout is utilized to seal the overcapsule and the undercapsule together to join them and to seal the injection port.

Accordingly, a principal object of the present invention is to provide apparatus for encapsuling hazardous wastes that are stored in drums.

Another object of the present invention is to provide a method of encapsuling hazardous waste stored in drums.

Another object of the present invention is to provide safe transportation and storage of hazardous wastes.

These and other objects of the present invention will be more completely disclosed and described in the following specification, the accompanying drawings and the appended claims.

BRIEF DESCRIPTION OF THE DRAWINGS

FIG. 4 is a sectional view similar to FIGS. 2 and 3 showing the overcapsule and the drum with encapsulation grout between them and with solidification grout introduced into the drum.

FIG. 5 is a sectional view similar to FIG. 4 with the undercapsule in place below the overcapsule and the drum of hazardous waste.

DESCRIPTION OF THE PREFERRED EMBODIMENT

Figure 1:
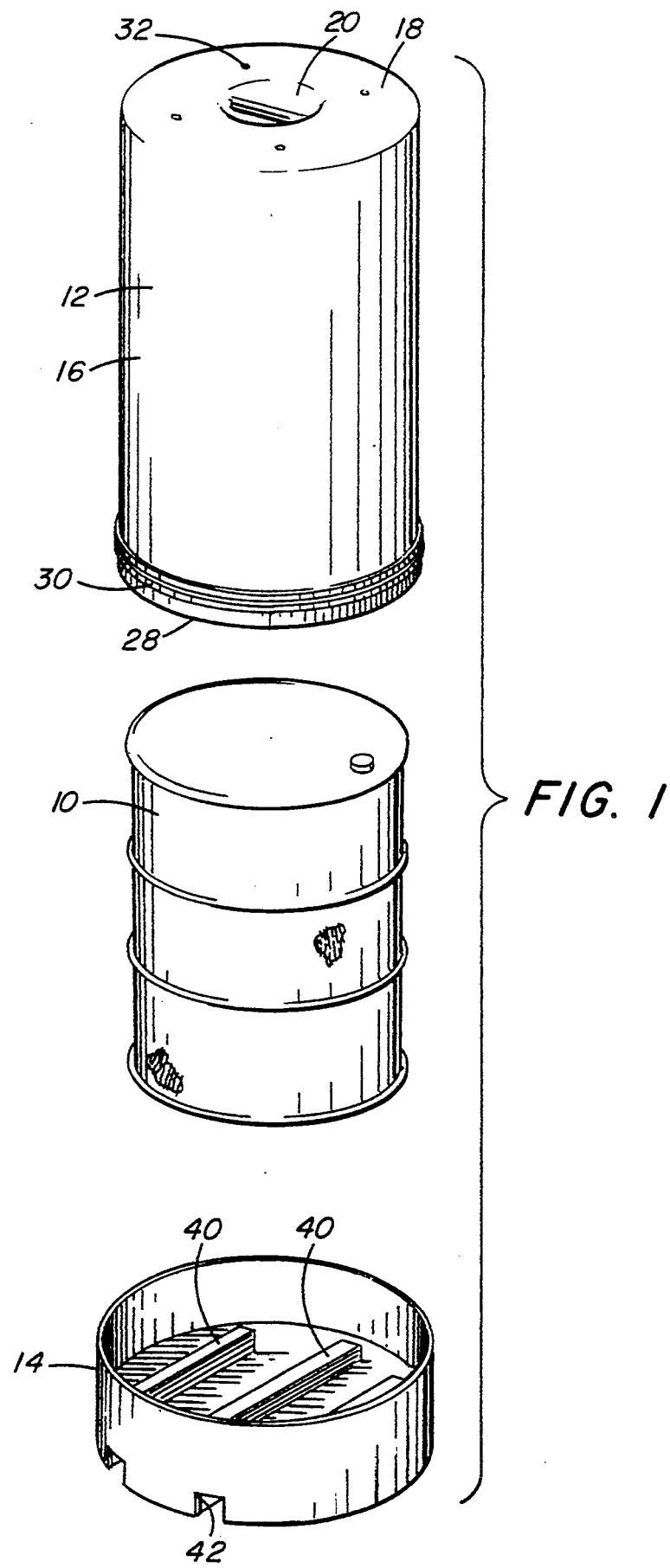
FIG. 1 is an exploded perspective view of the capsule of the present invention in relation to a cylindrical drum containing hazardous wastes.

Referring now to the drawings, there is shown a drum 10 containing hazardous waste material. As illustrated in FIG. 1, the drum 10 is in a deteriorated condition which may permit leakage from the drum. It has been found that throughout the world, many hazardous waste materials have been stored in 55 gallon drums which are now beginning to deteriorate and leak and cause problems with retaining the hazardous waste material.

The waste products from many nuclear processing plants have been stored in 55 gallon drums and simply stacked in large warehouses. As part of the nuclear cleanup, it is now necessary to transport and safely store the hazardous waste materials which, in many instances, are radioactive.

The present invention is directed to safely encapsuling cylindrical drums containing hazardous material, which may be radioactive, in order to transport and thereafter store the material. Because some of the hazardous waste may be so dangerous that humans cannot work in the vicinity of the waste without impairing their health, some of the hazardous waste cleanup must be accomplished by robotic equipment that is remotely controlled at a safe distance from the actual work site. The present invention is directed to apparatus and a method for encapsuling hazardous waste material in a cylindrical drum that is readily adaptable to use with remote controlled robotic equipment.

As best seen in FIG. 1, the apparatus of the present invention includes an overcapsule 12 and an undercapsule 14. The overcapsule 12 has a cylindrical wall 16 and a-flat end wall. The end wall 18 has a circular recess 20 with a lifting bar 22 positioned across the recess and with the ends of the lifting bar extending into the internal portion of the overcapsule 12 as may be seen in FIGS. 2–5 and 10.

In some applications, it may be useful to provide vent tubes 24 within the overcapsule 12. The vent tubes are designed to puncture the drum 10 when the overcapsule is positioned over the drum 10 so that gases that may be contained within the drum 10 can be released.

Spaced at 120 degree intervals around the interior cylindrical surface of the overcapsule 12 are deformable spacers 26 which position the overcapsule 12 around the drum 10 so as to form a uniform annular space between them.

Figure 8:
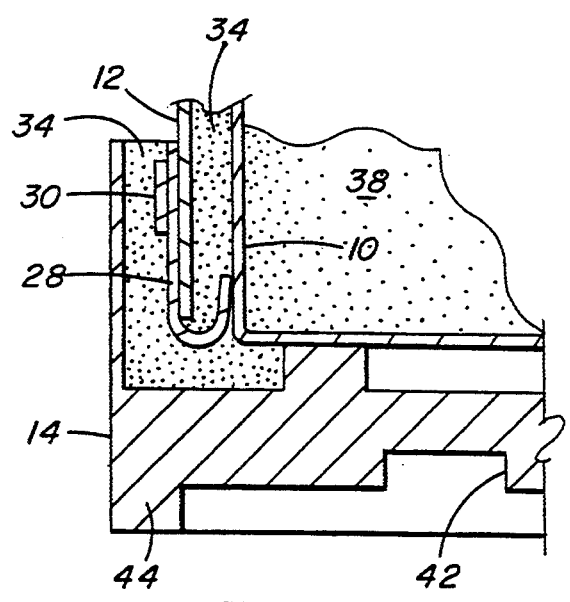
FIG. 8 is an enlarged detail of the circled portion of FIG. 5.
Figure 10:
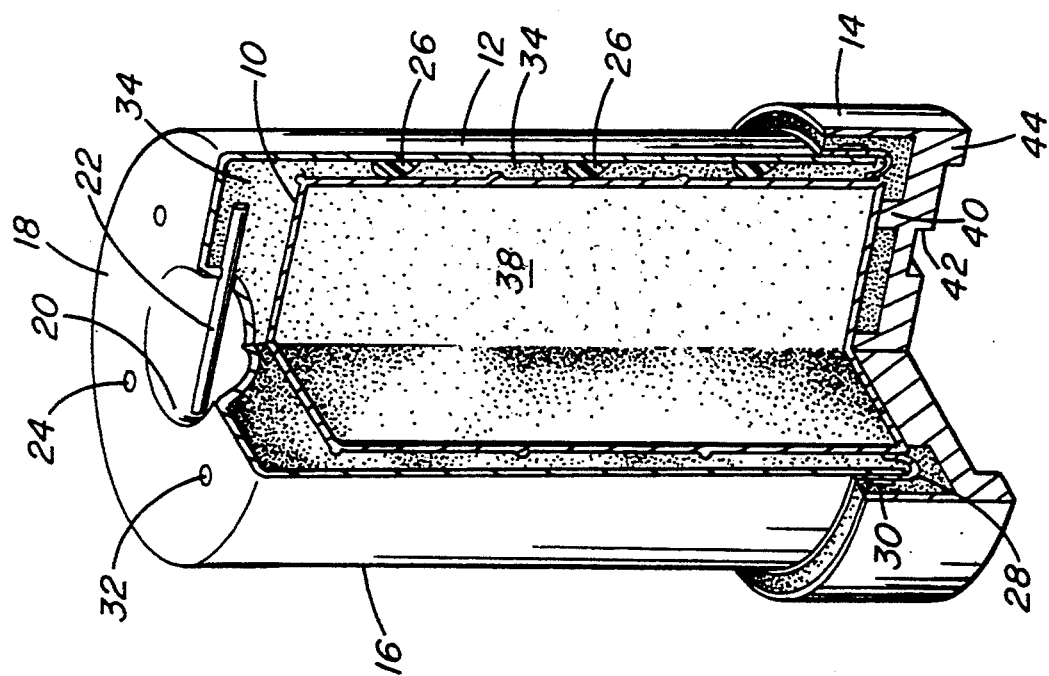
FIG. 10 is a perspective view similar to FIG. 9 with a portion cutaway to illustrate the interior of the capsule and drum.

A deformable annular seal 28 is secured to the bottom of the overcapsule cylindrical wall 16 by a seal ring 30 as is most clearly shown in FIG. 8. The annular seal 28 abuts the bottom of the cylindrical wall of drum 10 so as to seal the space between the drum 10 and the overcapsule 12.

Figure 9:
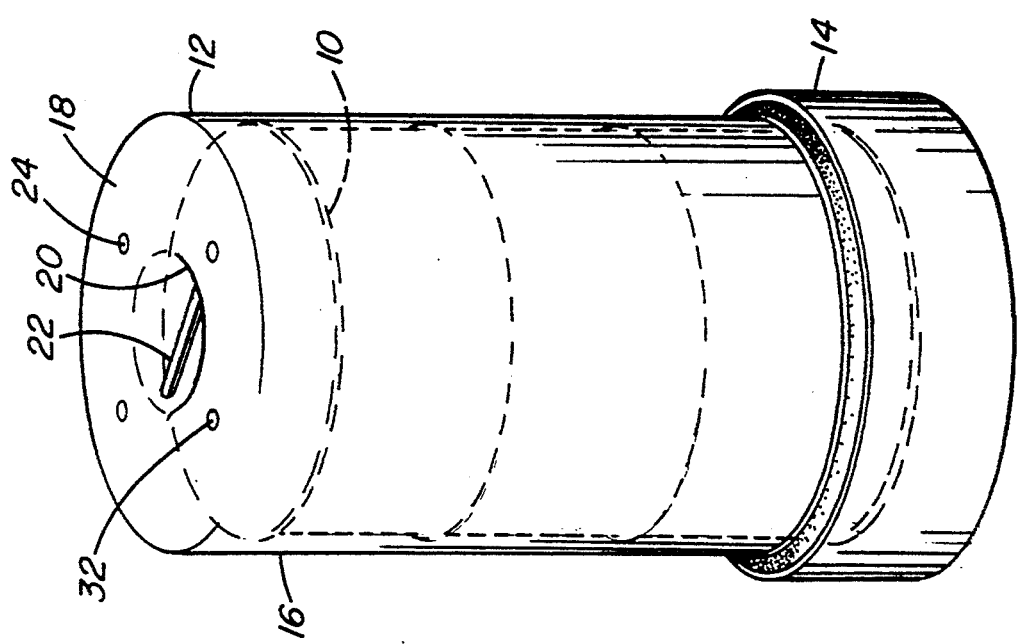
FIG. 9 is a perspective view of the assembled capsule of the present invention.

A port 32 (FIGS. 1, 9, 10) is formed within the overcapsule 12 to permit encapsulation grout 34 to be pumped into the space between the overcapsule 12 and the drum 10.

Figure 3:
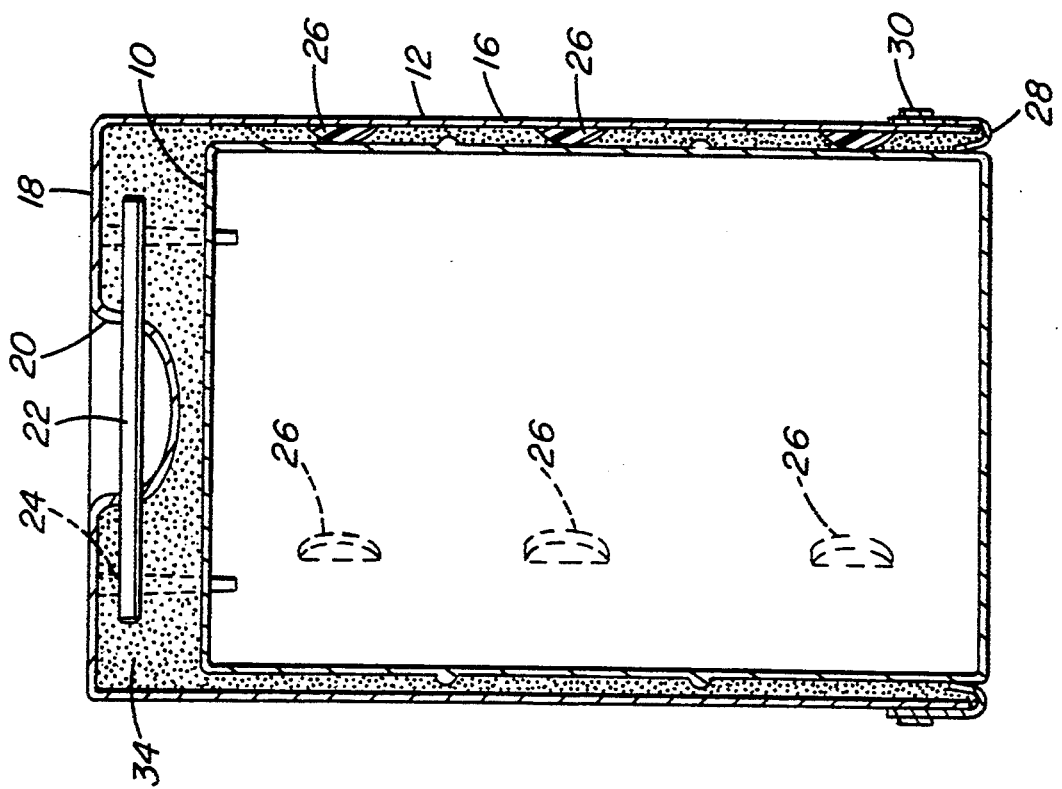
FIG. 3 is a sectional view similar to FIG. 2 showing the overcapsule and drum with encapsulation grout between them.
Figure 2:
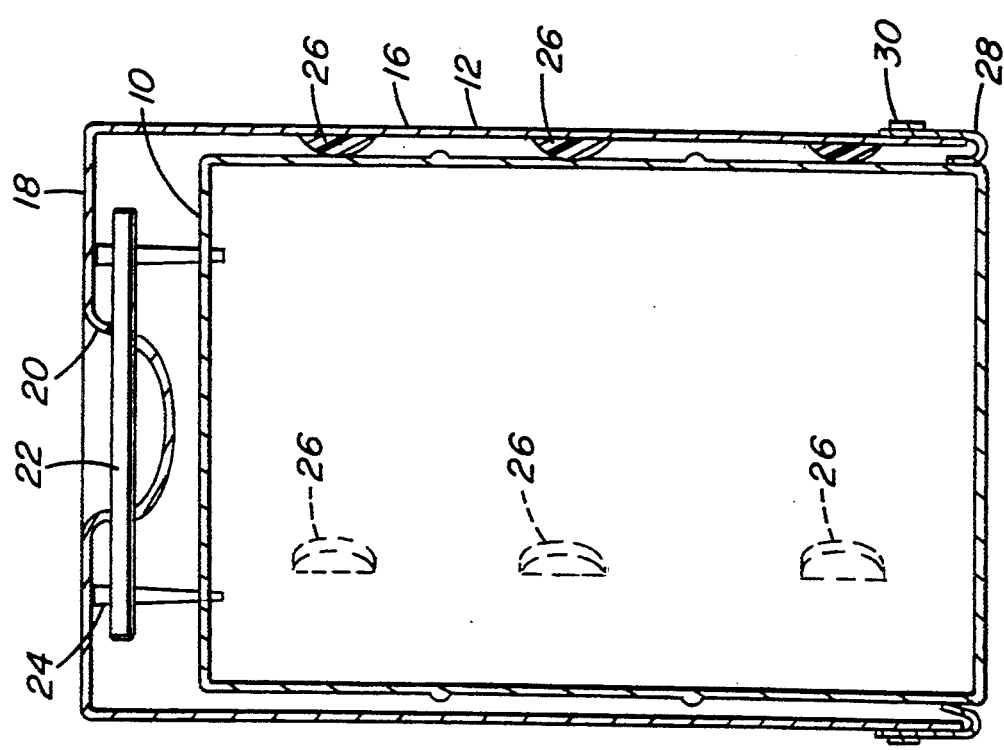
FIG. 2 is a sectional view showing the overcapsule of the present invention in position over the hazardous waste drum before any grout is introduced.
Figure 6:
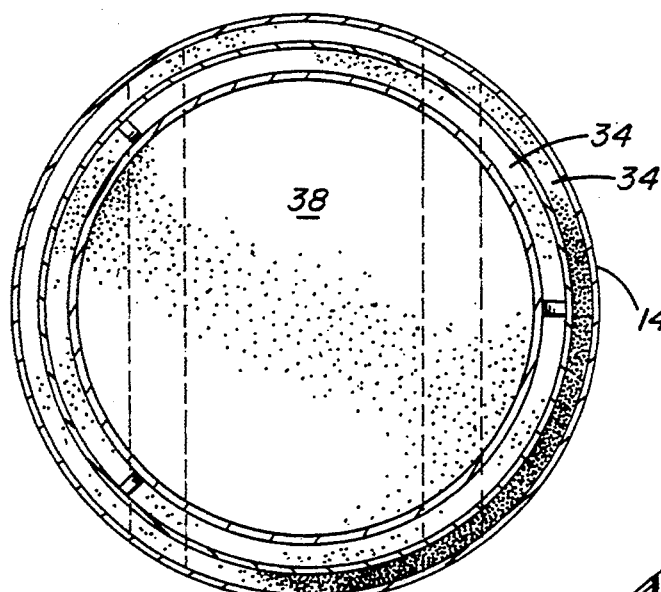
FIG. 6 is a sectional view taken along line VI—VI of FIG. 5.
Figure 7:
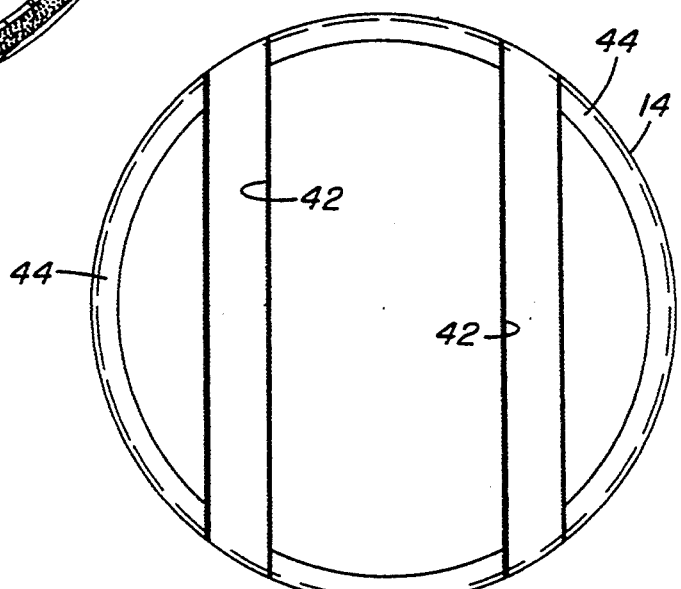
FIG. 7 is a bottom plan view as viewed from line VII—VII of FIG. 5.

As shown in FIG. 2, the overcapsule 12 is first positioned over the drum 10 so that the spacers 26 within overcapsule 12 contact the cylindrical wall of drum 10 and space the overcapsule 12 relative to the drum 10 so that there is a uniform annular space between them. As shown in FIG. 3, encapsulation grout 34 is pumped into the space between the drum 10 and the overcapsule 12 to harden and thereby entrap the drum 10 within the overcapsule 12. After the encapsulation grout 34 hardens, a port 36 (FIG. 4) is formed near the bottom of the overcapsule 12 through the overcapsule wall, through the encapsulation grout 34 and through the wall Of the drum 10. In some instances, a solidification grout 38 is then pumped into the interior of drum 10 through port 36 to solidify and stabilize the waste material within drum 10. It will be appreciated that some hazardous waste material will not require solidification by means of injecting solidification grout into it, whereas other types of hazardous waste material will require such solidification and stabilization.

After the solidification grout 38 has hardened within the drum 10, as shown in FIG. 4, the overcapsule and the grouted drum 10 within the overcapsule may be lifted by attaching a crane or robotic equipment to lifting bar 22 which has now been solidly grouted by encapsulation grout 34 so that the undercapsule 14 may be positioned under them. The generally cylindrical undercapsule 14 has support rails 40 (FIG. 1) upon which the drum 10 and the overcapsule 16 are supported. The undercapsule 14 also has fork lift tunnels 42 spaced apart from each other (FIG. 5) which permit the forks of a fork lift truck to be positioned within them to lift the encapsuled drum at a later time. The undercapsule 14 also has a bottom flange 44 extending around its periphery (FIGS. 5 and 10) and the interior diameter of the bottom flange 44 is such that it can be stacked over the overcapsule 12 of another encapsuled drum.

Before the grouted overcapsule of FIG. 4 is placed upon the undercapsule 14, additional liquefied encapsulation grout 34 is placed within undercapsule 14. When the grouted drum 10 and overcapsule 12 are positioned within the undercapsule, the encapsulation grout 34 completely seals the port 36 and sealingly joins the overcapsule 12 to the undercapsule 14 to produce the totally encapsuled drum shown in FIGS. 5, 9 and 10.

The overcapsule 12 and the undercapsule 14 maybe formed of steel or of high strength plastic, depending upon the materials that will be utilized with them.

The encapsulation grout utilized with the present invention has been developed for its radiation shielding ability. The grout is manufactured by Wallace Construction Specialties, Ltd., 825 McKay Street, Regina, Saskatachewan, Canada. It is a blended, mass loaded polymer grout that is pumpable until it sets. It is composed of a catalyst, a resin and dense aggragate which, when combined, form a very dense durable grout. The encapsulation grout has the following physical properties:

| | |
|---|---|
| Density | 250 lb/cu. ft. |
| Tensile Strength (ASTM C307-61 Modified) | 2,400 psi (16.5 MPa) |
| Compressive Strength (ASTM C579-75 Method B) | 13,700 psi (94.4 MPa) |
| Tensile Bond Strength (To Steel) | 2,400 psi (16.5 MPa) |
| Shrinkage: Unrestrained, Linear (SPIERF 12-64) | 0.004 in/in |
| Coefficient of Thermal Expansion 70–140° F. (ASTM C531-88) | $15.3 \times 10^{-6}$ in/°F. $27.5 \times 10^{-6}$ in/°C. |
| Chemical Resistance | Good resistance to oxidizing solutions |
| Flash Point - Liquid | 86° F. (30° C.) |
| Flash Point - Hardener | 175° F. (80° C.) |

It will be appreciated that other types of encapsulation grout may be utilized, particularly if the hazardous waste within the drum 10 does not require radiation shielding. In some instances, common aggregate concrete may suffice for protecting the material within the drum 10.

The solidification grout, if required, will vary depending upon the hazardous waste material stored in the drums 10. Avanti International, 822 Baystar Boulevard, Webster, Tex. 77598-1528 offers a line of grout material that stabilizes and hardens various hazardous wastes that may be stored in drums. Some examples of Avanti products which may be utilized as solidification grout in the present invention are its AV-202 Multi Grout, its Scotch-Seal Chemical Grout 5600, its AV-500 High Mod Epoxy Gel, its AV-530 Epoxy Injection Resin and its AV-540 Standard Epoxy Injection Resin. It will be appreciated that other solidification grouts may be developed and utilized for the particular hazardous waste materials that may be stored inside the drum 10.

When utilized to encapsulate deteriorated drums containing hazardous wastes, the apparatus and method of the present invention permits the hazardous waste material to be stabilized before the drum is moved at all. With the drum in an unmoved position, the overcapsule 12 is placed over the drum and the encapsulation grout 34 is injected between the drum and the overcapsule and permitted to harden. After hardening of the encapsulation grout, the solidification grout 38 is injected into the drum 10 thereby solidifying and stabilizing the material within drum 10. Once the solidification grout 38 is fixed within the drum 10, the entire package of the overcapsule 12 and the drum 10 may be lifted onto the undercapsule 14.

According to the provisions of the patent statutes, we have explained the principle, preferred construction and mode of operation of our invention and have illustrated and described what we now consider to represent its best embodiment. However, it should be understood that, within the scope of the appended claims, the invention may be practiced otherwise than as specifically illustrated and described.

We claim:

1. A method of encapsulting a cylindrical drum containing hazardous waste material for subsequent transportation and storage of said drum comprising the steps of:

placing an inverted over-capsule over said drum before said drum is relocated to enclose the top and the entire cylindrical wall of said drum with the walls of said over-capsule being spaced apart from said top wall and said cylindrical wall of said drum;

sealing the space between the bottom of said drum cylindrical wall and said over-capsule;

injecting into the space between said cylindrical drum and said over-capsule an encapsulation grout that hardens to form a dense shell around said cylindrical drum;

placing said over-capsule and said drum onto an under-capsule; and sealing said over-capsule and said under-capsule together with encapsulation grout between said over-capsule and said under-capsule to join them to each other.

2. The method of claim 1 wherein after said encapsulation grout is injected between said cylindrical drum and said over capsule and hardens, an injection port is formed through the lower portion of said over-capsule, said hardened encapsulation grout and said drum and thereafter a solidification grout is injected through said port to solidify and stabilize said hazardous waste material within said drum.

3. The method of claim 1 wherein said over-capsule has a lifting bar fixed thereto to lift said over-capsule and said drum.

4. The method of claim 1 comprising the additional step of inserting vent tubes formed in said over-capsule into said cylindrical drum.

5. The method of claim 1 wherein said under-capsule has a fork lift tunnel formed in its lower surface.

6. The method of claim 1 wherein said over-capsule has spacers formed therein to maintain separation between said over-capsule and said drum cylindrical wall before said encapsulation grout is injected between said over-capsule and said drum.

* * * * *